United States Patent [19]
Hartkorn

[11] 4,218,315
[45] Aug. 19, 1980

[54] OXIDATION AND ADSORPTION METHOD FOR REMOVING CONTAMINATING SUBSTANCES FROM LIQUIDS

[76] Inventor: Karl H. Hartkorn, Heinrich-Zille. Strasse 37, 6085 Nauheim, Fed. Rep. of Germany

[21] Appl. No.: 941,020

[22] Filed: Sep. 11, 1978

Related U.S. Application Data

[63] Continuation of Ser. No. 770,387, Feb. 22, 1977, abandoned, which is a continuation of Ser. No. 597,978, Jul. 22, 1975, abandoned.

[30] Foreign Application Priority Data

Jul. 29, 1974 [DE] Fed. Rep. of Germany ....... 2436498

[51] Int. Cl.$^2$ ................ C02B 1/10; C02B 1/14; C02B 1/36
[52] U.S. Cl. .................... 210/26; 210/28; 210/29; 210/32; 210/45; 210/48; 210/50; 210/62; 210/63 Z; 210/80; 204/149; 204/152
[58] Field of Search ................ 210/27–29, 210/32, 42 R, 47, 48, 50–53, 60–63 Z, 79, 80, 222, 223, 263, 284, 26, 45; 204/149, 152; 252/450

[56] References Cited

U.S. PATENT DOCUMENTS

| | | | |
|---|---|---|---|
| 763,026 | 6/1904 | Schweitzer | 204/152 |
| 1,505,104 | 8/1924 | Moerk | 210/53 |
| 2,232,295 | 2/1941 | Urbain et al. | 210/28 |
| 2,632,733 | 3/1953 | Sherwood | 210/50 |
| 2,793,183 | 5/1957 | Thurman | 210/28 |
| 3,343,680 | 9/1967 | Rice et al. | 210/263 |
| 3,455,820 | 7/1969 | Joyce et al. | 210/80 |
| 3,472,739 | 10/1969 | Ross et al. | 252/450 |
| 3,539,509 | 11/1970 | Heitmann et al. | 210/222 |
| 3,619,420 | 11/1971 | Kemmer et al. | 210/6 |
| 3,635,817 | 1/1972 | Zuckerman | 210/28 |
| 3,733,268 | 5/1973 | Marschall | 210/63 Z |
| 3,767,046 | 10/1973 | Hartkorn | 204/152 |
| 3,779,909 | 12/1973 | Wisfeld et al. | 210/29 |
| 3,925,176 | 12/1975 | Okert | 204/152 |
| 3,986,951 | 10/1976 | Fremont | 204/149 |

*Primary Examiner*—Charles N. Hart
*Assistant Examiner*—Peter A. Hruskoci
*Attorney, Agent, or Firm*—Ernest F. Marmorek

[57] ABSTRACT

The specification describes an oxidation and adsorption method for removing contaminating materials (pollutants) from aqueous liquids. The liquids are first subjected to an electrochemical treatment for the purpose of coagulation or agglomeration and partial oxidation by addition of NaOCl. Following this, using sedimentation and/or flotation, the agglomerated and coalesced sludge is removed from the liquid. In the liquid an excess of $OCl^-$ remains and this liquid, enriched in this manner, is supplied to adsorption columns, in which inorganic adsorption compositions are located having a high specific surface area so that a further oxidation is achieved by the excess $OCl^-$, together with a partial adsorption and by addition of $O_3$, complete oxidation is achieved. The organic contaminating materials are converted into $CO_2$ products of adsorbing materials of different grain sizes and specific surface areas made of inorganic materials, following which the $CO_2$ escapes from the liquid and is stored. The thus cleaned liquid then leaves the oxidation and adsorbing columns.

4 Claims, 3 Drawing Figures

OXIDATION AND ADSORPTION METHOD FOR REMOVING CONTAMINATING SUBSTANCES FROM LIQUIDS

This is a continuation, of application Ser. No. 770,387, filed Feb. 22, 1977, now abandoned, which was a continuation of Ser. No. 597,978, filed July 22, 1975, now abandoned.

BACKGROUND OF THE INVENTION

Numerous methods have been proposed for the oxidation removal of contaminating materials from aqueous liquids.

Furthermore, a large number of adsorption methods have been proposed, for this purpose which however give rise to difficulties in their application since their degree of efficacy is dependent on knowledge of the polluting materials to be adsorbed.

Generally materials can only be adsorbed when the adsorbing material has an opposite charge.

Therefore, known adsorption methods are applicable if it is only a question of a few known contaminating materials in the liquids, which are to be removed. If the materials in the liquid are neutral, the adsorbing means then remain without effect.

In many cases these polluted liquids comprise conglomerates of contaminating materials which make it necessary to use a large number of adsorbing materials arranged one after the other. Such adsorption stages, arranged sequentially, give rise to disadvantages when they are regenerated. In the case of chemical regeneration many different types of eluates are produced which are difficult to handle; thermal regeneration is to be objected to on the grounds of its costs and complexity. Neutral liquid contaminants cannot be adsorbed at all unless they are previously transformed.

SUMMARY OF THE INVENTION

The invention described below avoids the disadvantages described above and furthermore makes it possible to reuse the eluates and gaseous products produced in the processes for recycling.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
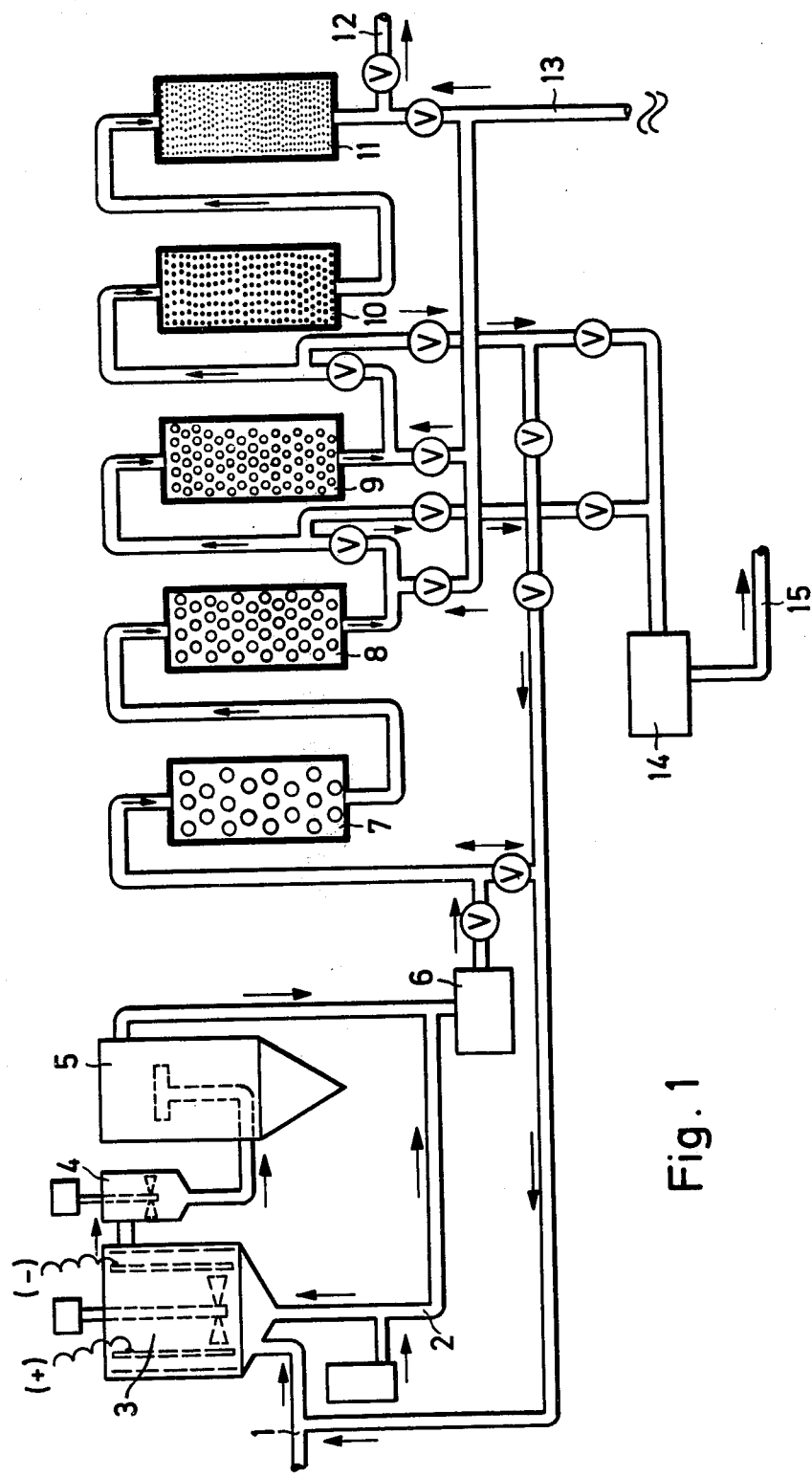
FIG. 1 is a schematic view outlining the sequence of operation for the method of the present invention.
Figure 2:
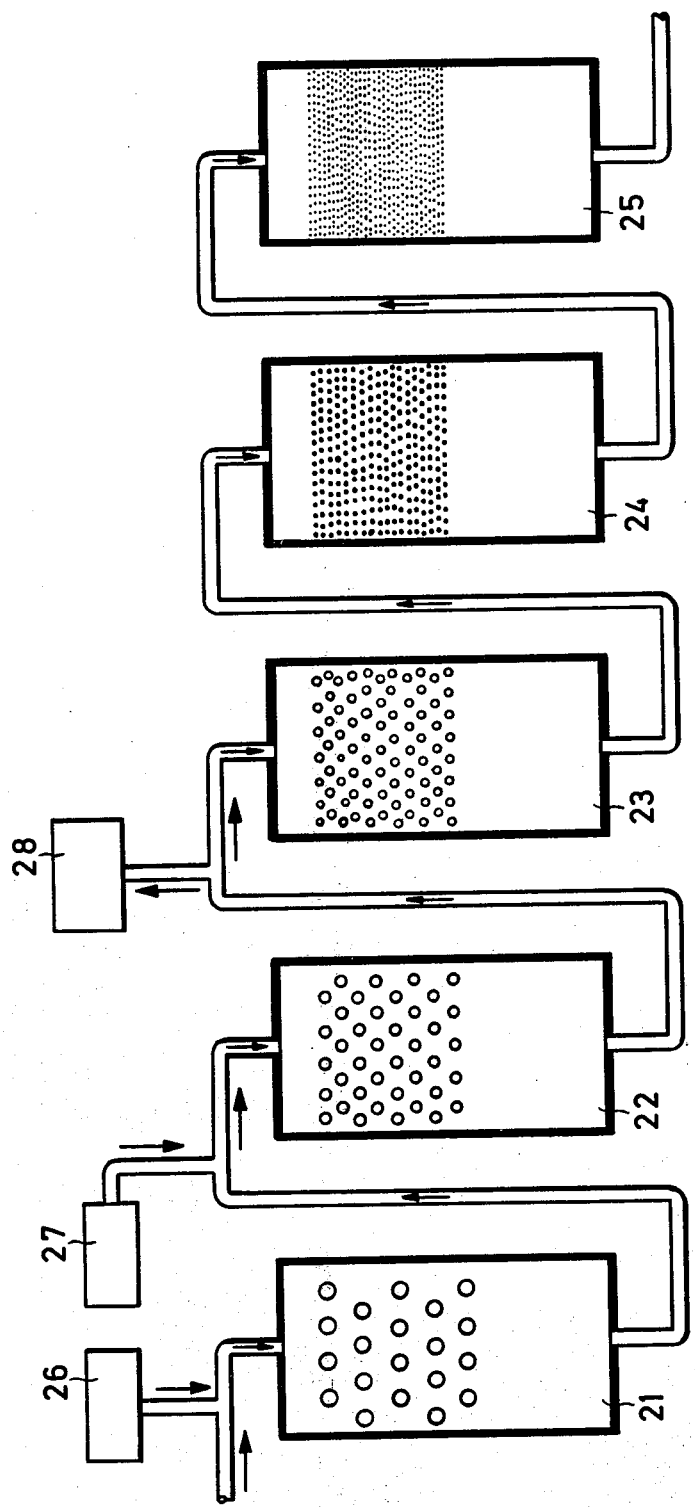
FIG. 2 is a schematic view of columns and containers used in the method of the present invention.
Figure 3:
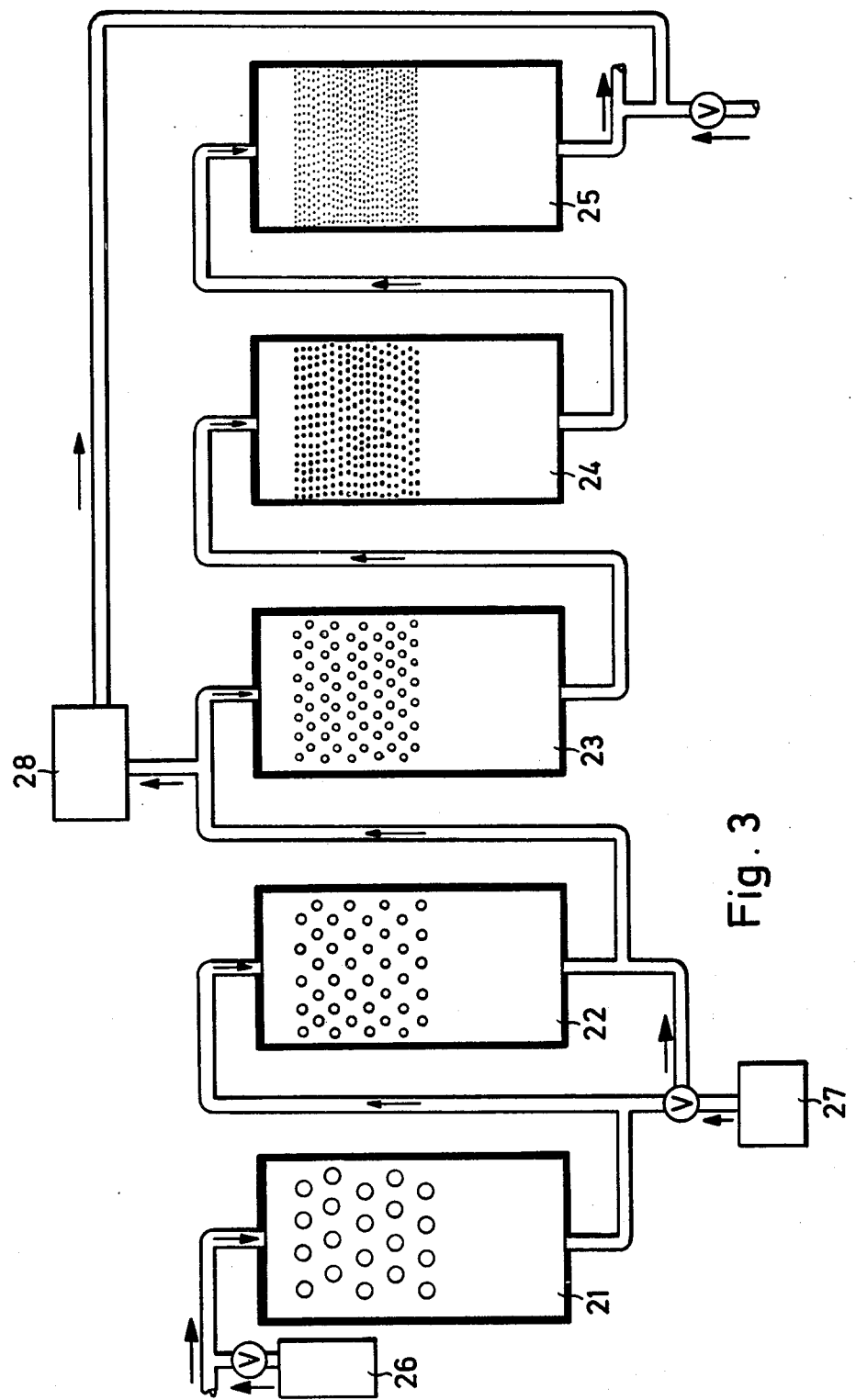
FIG. 3 is a schematic view outlining the sequence of operations for the regenerating step of the instant method.

In carrying the invention into effect, some embodiments have been selected for illustration in the accompanying drawings and for description in this Specification, reference is had to FIGS. 1, 2 and 3.

Preferably the aqueous liquids containing the contaminating or polluting materials, see FIG. 1, are firstly subjected to an electrochemical agglomeration or coagulation process e.g., the electro-M-method which is known, is described in applicant's U.S. Pat. No. 3,767,046, issued on Oct. 23, 1973, by which contaminants from the macro-range to the colloidal suspension range are substantially coagulated or agglomerated and removed. The liquid then only contains residues of colloidal suspensions and dissolved materials.

In accordance with FIG. 1 as indicated by reference numeral 2 NaOCl is supplied during the electrochemical process, which is disassociated under the electrolytic effects. $OCl^-$ is released as a radical at the anodes and has a strong oxidizing action on the dissolved organic substances.

The processes occurring in the electrochemical apparatus 3 of FIG. 1, can be continuous or discontinuous. The liquid-sludge mixture thereformed, passes after the process, which only lasts for a short time, into a container 4, where the mixture is subjected to high mechanical accelerations.

Following this the liquid is supplied to either a sedimentation or a flotation separation installation 5 for sufficient time to complete the separation treatment. preferably the operation is carried out with an excess of $OCl^-$ so that during the sedimentation or flotation separation process oxidizing reactions can be forced to take place as well.

Following this the liquid freed from the sludge components passes to a pump 6 where possibly further NaOCl is added to it and it then passes to adsorption columns 7–11 containing preferably inorganic adsorbent materials as for example porous, pressed glauconite, porous, pressed fire clay, silicates and montmorillonite, preferably in spherical form, arranged that for a given spatial volume a large surface is present in the first columns for the liquid percolates fed therethrough.

In this respect owing to the presence of the $OCl^-$, there is a further oxidizing effect on the contaminating materials and, for example, sugar compounds are broken down to form decomposition materials.

In the column 9 use is preferably made of broken material with diameters of 0.8 to 1.5 mm so that the adsorption surface reaches up to 300 square meters per gram of the fill. The adsorbing material can be activated so as to be acidic or alkaline so that owing to a change in the hydrogen ion concentration a further improvement of the adsorbing capacity is achieved.

In columns 10 and 11, it is possible to use still finer materials and in the last column stage, it is possible to use a suitable form of activated charcoal.

Accordingly the contaminants are removed, step by step, with a simultaneous oxidation in the first columns by means of $OCl^-$. It is possible to ensure at the same time that no biological growth or lawn is formed which might clog the columns.

In FIG. 1 reference numeral 12 shows the exit for the liquid freed its contaminating materials.

Reference numeral 13 indicates means for reverse flushing of the adsorption columns 7–11 with fresh water or acids and alkalis, separate reverse swilling or flushing of the individual stages being possible.

The eluates may be recycled either combined or separately to the preliminary purification process stages and deflocculated, coagulated, or agglomerated out in the course of the electrochemical reactions.

While columns 7 and 8 are preferably regenerated by reverse flushing, columns 9, 10 and 11 can have their adsorption materials discharged using water or air and supplied to a thermal regeneration plant 14, in which in the absence of oxygen the material is heated at temperatures above 240° C.

After this thermal regeneration process, in which the adsorbed materials are carbonized so that the adsorption effect of the regenerated material is increased, the regenerate can be returned to the adsorption columns.

In FIG. 2, reference numerals 21 to 25 diagrammatically indicate the individual columns.

Reference numeral 26 denotes the supply container for the NaOCl, while reference numeral 7 represents a container with $O_3$. In the presence of $O_3$ a substantial oxidation of the remaining organic contaminating materials in the liquid occurs so that $CO_2$ is produced and is liberated as a gas. The $CO_2$ is stored in a gas storage means 28 and is available for further use.

In FIG. 3 reference numerals 26 and 27 denote the NaOCl-container and the $O_3$-container though in this case there is a feed connection both below and at the top while reference numeral 28 denotes the $CO_2$-collector with a supply line leading to the reverse flushing line for regeneration by $CO_2$. If in the last stages column 25 acidic adsorbing materials are used and if they become exhausted, $CO_2$ is pumped into these last columns under the control of a pH-meter until the desired degree of acidity in the adsorption material has been produced again. The restoration of the adsorption capacity of the last stage is accordingly made possible by using $CO_2$ for recycling this stage.

The advantage of this combined oxidizing and adsorbing method can be illustrated by way of example in the case of the effect of aerobic microorganisms, the electrochemical and electromagnetic effect of the precleaning being of particular significance.

In classical methods 25% of organic contaminating materials are removed from liquids, for example by sedimentation or flotation. A further 70% is removed by biochemical oxidation and adsorption on the mass of bacteria.

In the case of the method in accordance with the invention in the case of the electrochemical process using the preferred electro-M-method, up to 80% of the organic contaminant content is removed from the liquid and the liquid is simultaneously made an electrolyte with a high charge. If during the electrochemical process NaOCl is added to the liquid, the dissolved organic contaminating materials of the liquid are substantially oxidized by the $OCl^-$ released at the anode as an ion.

The removal of contaminating materials can be accelerated by providing the sedimentation vessel with a powerful electromagnet, which compells the coagulated sludge, enriched with magnetic metal ions to undergo rapid sedimentation.

If in the electrochemical process NaOCl is added in excess, then in the first stage of the oxidation and adsorption column the dissolved organic substance is further oxidized and the oxidation residues become deposited partly on the first stage coarse-grained adsorption compositions.

By adding $O_3$, in the embodiments of FIGS. 2 and 3, these quantities are substantially less than in the case of the direct ozonization of liquids, since only residual quantities of dissolved organic substances are present, the remaining oxidation occurs and as a product $CO_2$ is produced and the oxidation residue, which just as is the case with biochemical processes becomes deposited in an adsorptive manner on the adsorbing composition.

When the adsorption materials become charged, their regeneration is carried out by reverse flushing. The re-activation regeneration can be carried out by passing $CO_2$, obtained in the above-described processes or by the addition of commercial quality $CO_2$ for acidic activation. If a basic activation is necessary, the latter can be carried out by the addition of caustic soda.

When the adsorption materials are completely exhausted, they are regenerated thermally by the exclusion of oxygen at temperatures of more than 250° C. Any organic materials deposited on the adsorbers, and are carbonized as a result of the thermal regeneration enhance the adsorbing action of the adsorbing materials after such activation. The fine, powdered material produced during thermal regeneration is also activated or is added to the electrochemical process stage after suitable activation so that even during the coagulation and sedimentation stages correspondingly increased adsorption action is achieved.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A process for removing contaminating materials from a polluted aqueous liquid, said contaminating materials including solid contaminants, ranging in size from suspended solids in the macrorange through colloids and dissolved organic contaminants, which comprises the steps of:
   (a) adding a predetermined amount of NaOCl solution to said liquid, forming a mixture;
   (b) electrolyzing said mixture to coagulate at least some of said contaminants into a sludge and to form $OCl^-$ ions capable of oxidizing said contaminants;
   (c) separating the sludge from said mixture, said remaining mixture containing dissolved organic contaminants and residual $OCl^-$ ions, said predetermined amount of NaOCl solution being at least adequate to yield said residual $OCl^-$ ions;
   (d) adding ozone to said remaining mixture to oxidize said dissolved organic contaminants to form $CO_2$ and an oxidation residue;
   (e) contacting said remaining mixture with particles of an inorganic solid adsorbent by percolating said remaining mixture through a column containing a bed of said adsorbent so as to oxidize said contaminants with said residual $OCl^-$ ions and said ozone;
   (f) adsorbing the oxidation residue from said remaining mixture on said inorganic solid adsorbent while venting and collecting the $CO_2$;
   (g) regenerating said inorganic adsorbent by flushing with the collected $CO_2$; and
   (h) collecting the decontaminated aqueous liquid after percolation through said inorganic adsorbent bed.

2. The process according to claim 1, wherein the adsorbents are porous adsorbents selected from the group consisting of pressed glauconite, pressed fire clay, silicates, and montmorillonite, and are in substantially spherically form, and have an adsorption surface in excess of 300 meters$^2$ per gram.

3. The process according to claim 1, wherein the adsorbents are acid-activated.

4. The process according to claim 1, wherein the adsorbents, upon loss of adsorption ability after initial regeneration, are thermally regenerated at temperatures above 240° C.

* * * * *